Patented July 11, 1950

2,514,960

UNITED STATES PATENT OFFICE 2,514,960

DEALKYLATION OF ALKYLPHENOLS

Daniel B. Luten, Jr., Berkeley, and George M. Good, Albany, Calif., assignors to Shell Development Company, San Francisco, Calif., a corporation of Delaware No Drawing. Application March 8, 1947, Serial No. 733,428

10 Claims. (Cl. 260—621)

1

This invention relates to the dealkylation of alkylphenols, and more specifically provides a process for the selective removal of alkyl groups of at least four carbon atoms from phenolic compounds.

It is frequently desirable or necessary to employ a process of dealkylation in order to prepare simpler and more valuable aromatic compounds from the complex commercially available mixtures thereof. Dealkylation is also a step in a heretofore described process for the separation of certain isomeric aromatic compounds, such as cresols. For example, a mixture of isomeric cresols having identical or substantially identical boiling points may be alkylated and the resulting alkylated cresols, having substantially different boiling points, may be separated by fractionation. The separated alkylated cresols may then be dealkylated to yield the original cresols.

We have now discovered that certain catalysts, namely the clay-type synthetic catalysts, when used in accordance with the hereinafter described process, are surprisingly effective in removing alkyl groups of at least four carbon atoms, and especially tertiary alkyl groups of at least four carbon atoms, from phenols without affecting the hydroxyl group or lower alkyl substituents such as methyl or ethyl radicals which may be attached to the aromatic nucleus.

In accordance with the process of the present invention, a phenolic compound containing at least one alkyl group of at least four carbon atoms attached to the aromatic nucleus is contacted in the vapor state with a clay-type synthetic catalyst, held to a temperature of from 250 to 550° C. at a flow rate of from 0.1 to 20 liters of the liquid reactant per hour per liter of catalyst. The desired dealkylated phenolic compound is then separated from the effluent gases, for example, by condensation of the effluent gases and fractionation. Any unreacted material may be recycled through the catalyst, and the olefin produced by the reaction may be recovered as a valuable by-product.

The catalysts used for the dealkylation of aromatic compounds in processes heretofore described are generally of the strongly acidic type, such as sulfuric acid, sulfuric acid esters, phosphoric acid, aluminum chloride, molecular compounds of aluminum chloride with various organic substances, and the like. These catalysts, however, present certain difficulties which render them unsuitable for the purposes of the present invention. For example, such catalysts, when used at temperatures sufficiently high to achieve

2 substantial conversion, commonly split off lower alkyl groups, such as methyl and ethyl, from the aromatic ring, and may also attack the hydroxyl group of phenolic compounds. The strongly acidic type catalysts may also cause serious corrosion difficulties in the dealkylation apparatus and are frequently unsuitable for vapor phase dealkylation processes.

The clay-type synthetic catalysts usually consisting largely of silica, alumina, magnesia, or various combinations thereof, which may be modified by the addition of various promoters, such as boria, zirconia, and the like, are advantageously employed in the process of our invention. Such clay-type synthetic catalysts are used for the cracking of hydrocarbon oils, such as gas oils and heavy naphthas, for the production of lower molecular weight materials, usually low molecular weight gaseous hydrocarbons and/or gasoline-type liquids. In view of the known capacity of these catalysts to cause cracking, the process of our invention is especially surprising since it would be expected that subjection of alkylated phenols to the action of such catalysts at elevated temperatures would result in the splitting off of lower alkyl groups, such as methyl and ethyl, as well as the higher alkyl groups, and that such a process would split off the phenolic hydroxyl group. As a result of its unobviousness, it has not been known heretofore that the clay-type synthetic catalysts could serve to selectively remove alkyl groups of at least four carbon atoms from phenolic compounds, while leaving unaffected lower alkyl groups, such as methyl and ethyl, and the hydroxyl group. Our invention provides such a process.

As above explained, the catalysts used in the process of the present invention are synthetic and of the clay-type. We have discovered that the synthetic clays, e. g., mixtures of alumina and silica, alumina and boria, or silica and magnesia, are exceptionally suitable for use in the process of our invention, and are the preferred catalysts. These catalysts may be prepared by methods known to the art, as for example by precipitating silica from a solution of sodium silicate, preferably removing the sodium ions, and depositing thereon or admixing therewith alumina, magnesia, or the like. As specific examples of our preferred catalyst, the following compositions give excellent results in the process of the present invention: 1 to 50% alumina and 99 to 50% silica, and preferably 1 to 15% alumina and 99 to 85% silica; 65 to 97% alumina and 35 to 3% boria, and preferably 85 to 90% alumina and 15 to 10% boria; 70 to 95% silica and 30 to 5% magnesia, and preferably 80 to 90% silica and 20 to 10% magnesia. To these synthetic clay-type catalysts may be added various promoters, such as zirconia, thoria, vanadia, and the like. Such promoters usually do not constitute more than 15% of the catalyst, and usually constitute from about 1 to about 10% thereof. Such promoters are valuable in increasing conversion to the desired products, decreasing polymerization and copolymerization of the reactants and products, and in decreasing carbonization thereby increasing the effective life of the catalysts.

The phrase "consisting essentially of" as used in the attached claims means that the catalysts are made up almost entirely of the synthetic ingredients recited and these synthetic ingredients are the main and characterizing ones, but this expression does not exclude the presence of minor amounts of other ingredients the presence of which has been specifically set forth herein as permissible in such minor amounts or which are merely inert. The presence of such other ingredients in minor amounts would not change the essential character of the catalysts with respect to their ability to catalyze the claimed reaction.

The catalysts employed in the execution of the present process may be used in any convenient form. For example, they may be prepared as pellets of a desired size, or they may be employed in powdered form. Where advantageous various carriers or supports may be used therewith, such as diatomaceous earth, which may itself exhibit some dealkylating activity. The activity of hereindescribed catalysts may decrease with use, but regeneration by burning off any carbonaceous deposit, the usual cause of loss of catalytic activity, by heating in the presence of a combustion-supporting gas restores the catalyst to approximately its initial activity. The time intervals between regeneration of the catalyst may be increased by increasing the temperature of the catalyst, or by decreasing the space velocity, when a decrease in catalytic activity is noted.

For best results, the optimum catalyst temperature will vary somewhat according to the particular material being dealkylated, and is also dependent upon other operating conditions, such as the contact time of the reactant with the catalyst. Under most operating conditions temperatures of from 350 to 450° C. give excellent results. However, at rapid flow rates of reactant through the catalyst, i. e., at relatively short contact times of reactant and catalyst, higher temperatures may be used, which in some instances may advantageously be as high as 550° C., whereas at relatively slow flow rates temperatures as low as 250° C. may advantageously be used. If the recited upper temperature limit be exceeded, undesirable side reactions may occur, while at temperatures below the recited limit, dealkylation is not sufficiently significant to make the process feasible.

The optimum flow rate, or space velocity, of material through the catalyst is largely dependent upon the other variables, such as temperature, but is usually in the range of from about 0.5 to 4 liters of the liquid reactant per hour per liter (about 800 grams) of catalyst. When operating at relatively high temperatures, fast flow rates of reactant may be employed, while at relatively lower temperatures slower flow rates are advantageous. In the dealkylation of phenolic compounds containing relatively large alkyl substituents, e. g., substituents of six or more carbon atoms, flow rates of about 20 liters of the liquid reactant per hour per liter of catalyst may be advantageously employed, while with lower substituents flow rates of about 0.1 liter of the liquid reactant per hour per liter of catalyst may be desirable in some instances. When operating within the preferred temperature limit of 350 to 450° C., and when employing the usual reactants, flow rates of from about 0.5 to 4.0 liters per hour of the liquid reactant per liter of catalyst are preferred.

As illustrative of a specific embodiment of the present invention, vaporized 2,4-dimethyl-6-tert-butylphenol is contacted with a clay-type catalyst at from 250 to 550° C. employing a flow rate of from 0.5 to 4.0 liters of the liquid reactant per liter of catalyst per hour. The effluent gases are subjected to condensation and the desired 2,4-xylenol (2,4-dimethylphenol) separated by distillation.

In a substantially identical manner, other phenolic compounds containing at least one alkyl group of at least four carbon atoms attached to the aromatic nucleus may be dealkylated, for example any of the mono or poly substituted phenolic compounds such as 2-tertiary-butylphenol, 4-tertiary-butylphenol, 2,4-ditertiary-butylphenol, 2,4,6-tritertiary-butylphenol, 2-tertiary-butylnaphthol, 4-tertiary-butylnaphthol, 2,4-ditertiary-butylnaphthol, 2-butylphenol, 2,4,6-tributylphenol, 2-butylnaphthol, 2,4-dibutylnaphthol, 2-methyl-4-butylphenol, 2-methyl-4-tertiary-butylphenol, 2,4-dimethyl-6-tertiary-butylphenol, 3-methyl-4,6-ditertiary butylphenol, 4-methyl-2,6-ditertiary-butylphenol, 2-ethyl-4-tertiary-butylphenol, 2,4-diethyl-6-tertiary-butylphenol, 2,4-diethyl-6-butylphenol, 2-methyl-4-ethyl-6-tertiary-butylphenol, 2-propyl-4-tertiary-butylphenol, 2-isopropyl-4-tertiary-butylphenol, 2-methyl-4-isoamylphenol, 2,4-dimethyl-6-amylphenol, 4 - methyl - 2 - tertiary - amylphenol. Other groups or atoms, such as chlorine may be attached to the aromatic ring, as for example in 2-methyl-4-chloro-6-tertiary-butylphenol, and will remain substantially unaffected by the process of our invention. Some groups, however, may be affected, and hence may be removed as well as the higher alkyl groups in the process of our invention.

When dealkylating aromatic phenolic compounds containing a propyl radical, and especially an isopropyl radical, attached to the aromatic nucleus, according to the process of the present invention, the propyl radical may be partially dealkylated, especially when operating under conditions so that the reactant-catalyst contact time is relatively large and the temperature of the catalyst relatively high. Thus, in addition to providing a process for the specific removal of alkyl groups containing four or more carbon atoms from aromatic phenolic compounds, the present invention may be employed to partially remove alkyl groups containing three carbon atoms, and by adjustment of the operating conditions the degree of dealkylation may be controlled. However, lower alkyl groups such as methyl and ethyl are substantially completely unaffected in our process.

Various modifications in the process of our invention will be apparent to those skilled in the art, and are within the scope of our invention. Thus, for example, while operation at atmospheric pressure is usually suitable, higher or lower pressures may be employed in some instances to advantage, and if desirable an inert gaseous diluent may be employed.

The following examples serve to illustrate preferred embodiments of the present invention, which is not to be considered as limited thereby except as defined in the appended claims.

Example I 2,4-dimethyl-6-tertiary-butylphenol was vaporized and passed through a catalyst bed comprising 86.2% silica, 4.3% alumina, and 9.4% zirconia, in the form of 1/8 inch pellets, at a flow rate of 2 liters of liquid reactant per liter of catalyst per hour. The temperature of the catalyst was maintained at about 400° C. The effluent gases were condensed and 2,4-xylenol recovered therefrom by fractionation. Conversion was over 61%, the reaction product consisting largely of the desired 2,4-xylenol.

Example II

Vaporized 3-methyl-4,6-ditertiary-butylphenol is passed through a catalyst bed comprising 1/8 inch pellets of 90% alumina and 10% boria at a flow rate of 1.5 liters of liquid reactant per liter of catalyst per hour. The temperature of the catalyst is held at about 350° C. The effluent gases are condensed and 3-methylphenol recovered therefrom by fractionation.

Example III 4-methyl-2,6-ditertiary-butylphenol is processed as described in Example I. 4-methylphenol is recovered substantially as described in Example I.

Example IV 2,4-diethyl-6-butylphenol is vaporized and the vapors, at a flow rate of about 4 liters of liquid reactant per liter of catalyst per hour, are contacted with a catalyst comprising 85% silica and 15% magnesia in powdered form at a temperature of about 450° C. 2,4-diethylphenol is recovered from the effluent gases by fractionation.

By the terms, "phenolic compound," and "phenol," as used herein, is meant to include those compounds which have a hydroxyl group attached to a carbon atom, which in turn comprises part of an aromatic nucleus.

The invention claimed is:

1. The process for the production of alkyl-substituted phenols having no more than three carbon atoms in a single alkyl substituent from poly-alkyl substituted phenols having an alkyl substituent containing at least four carbon atoms and an alkyl substituent containing less than four carbon atoms, which comprises contacting said poly-alkyl substituted phenols, in the vapor phase, at a temperature of from about 250 to about 450° C., with a synthetic catalyst formed by precipitation of the oxides consisting essentially of at least one member of the group consisting of alumina and silica, thereby selectively removing from said poly-alkyl substituted phenols alkyl substituents containing at least four carbon atoms.

2. The process for the production of alkyl-substituted phenols having no more than three carbon atoms in a single alkyl substituent from poly-alkyl substituted phenols having an alkyl substituent containing at least four carbon atoms and an alkyl substituent containing less than four carbon atoms, which comprises contacting said poly-alkyl substituted phenols, in the vapor phase, at a temperature of from 350 to 450° C., with a synthetic catalyst formed by precipitation of the oxides consisting essentially of at least one member of the group consisting of alumina and silica, thereby selectively removing from said poly-alkyl substituted phenols alkyl substituents containing at least four carbon atoms.

3. The process for the production of alkyl-substituted phenols having no more than three carbon atoms in a single alkyl substituent from poly-alkyl substituted phenols having a branched-chain alkyl substituent containing at least four carbon atoms and an alkyl substituent containing less than four carbon atoms, which comprises contacting said poly-alkyl substituted phenols, in the vapor phase, at a temperature of from about 350° C. to about 450° C., with a synthetic catalyst formed by precipitation of the oxides consisting essentially of at least one member of the group consisting of alumina and silica, thereby selectively removing from said poly-alkyl substituted phenols alkyl substitutents containing at least four carbon atoms.

4. The process for the production of alkyl-substituted phenols having no more than three carbon atoms in a single alkyl substituent from poly-alkyl substituted phenols having a branched-chain alkyl substituent containing four carbon atoms and an alkyl substituent containing less than four carbon atoms, which comprises contacting said poly-alkyl substituted phenols, in the vapor phase, at a temperature of from about 350° C. to about 450° C., with a synthetic catalyst formed by precipitation of the oxides consisting essentially of at least one member of the group consisting of alumina and silica, thereby selectively removing from said poly-alkyl substituted phenols alkyl substituents containing four carbon atoms.

5. The process for the production of alkyl-substituted phenols having no more than three carbon atoms in a single alkyl substituent from poly-alkyl substituted phenols having an alkyl substituent containing at least four carbon atoms and an alkyl substituent containing less than four carbon atoms, which comprises contacting said poly-alkyl substituted phenols, in the vapor phase, at a temperature of from about 350° C. to about 450° C., with a synthetic catalyst formed by precipitation of the oxides consisting essentially of 1 to 50% alumina and 99 to 50% silica, thereby selectively removing from said poly-alkyl substituted phenols alkyl substituents containing at least four carbon atoms.

6. The process for the production of alkyl-substituted phenols having no more than three carbon atoms in a single alkyl substituent from poly-alkyl substituted phenols having an alkyl substituent containing at least four carbon atoms and an alkyl substituent containing less than four carbon atoms, which comprises contacting said poly-alkyl substituted phenols, in the vapor phase, at a temperature of from about 350° C., to about 450° C., with a catalyst consisting essentially of 65 to 97% alumina and 35 to 3% boria, thereby selectively removing from said poly-alkyl substituted phenols alkyl substituents containing at least four carbon atoms.

7. The process for the production of alkyl-substituted phenols having no more than three carbon atoms in a single alkyl substituent from poly-alkyl substituted phenols having an alkyl substituent containing at least four carbon atoms and an alkyl substituent containing less than four carbon atoms, which comprises contacting said poly-alkyl substituted phenols, in the vapor phase, at a temperature of from about 350° C. to about 450° C., with a synthetic catalyst formed by precipitation of the oxides consisting essentially of 70 to 95% silica and 30 to 5% magnesia, thereby selectively removing from said poly-alkyl substituted phenols alkyl substituents containing at least four carbon atoms.

8. The process for the production of 2,4-xylenol from 2,4-dimethyl-6-tertiary-butylphenol, which comprises contacting said 2,4-dimethyl-6-tertiary-butylphenol, in the vapor phase, at a temperature of from about 350° C. to about 450° C., with a synthetic catalyst formed by precipitation of the oxides consisting essentially of at least one member of the group consisting of alumina and silica, thereby selectively dealkylating said 2,4-dimethyl-6-tertiary-butylphenol to 2,4-xylenol.

9. The process for the production of 3-methylphenol from 3-methyl-4,6-ditertiary-butylphenol, which comprises contacting said 3-methyl-4,6-ditertiary-butylphenol, in the vapor phase, at a temperature of from about 350° C. to about 450° C., with a synthetic catalyst formed by precipitation of the oxides consisting essentially of at least one member of the group consisting of alumina and silica, thereby selectively dealkylating said 3-methyl-4,6-ditertiary-butylphenol to 3-methylphenol.

10. The process for the production of dimethylphenol from a poly-alkyl substituted phenol having in addition to two methyl substituents an alkyl substituent containing at least four carbon atoms, which comprises contacting said poly-alkyl substituted phenol, in the vapor phase at a temperature of from about 350° C. to about 450° C., with a synthetic catalyst formed by precipitation of the oxides consisting essentially of at least one member of the group consisting of alumina and silica, thereby selectively dealkylating said poly-alkyl substituted phenol to dimethylphenol.

DANIEL B. LUTEN, JR.
GEORGE M. GOOD.

REFERENCES CITED

The following references are of record in the file of this patent:

UNITED STATES PATENTS

| Number | Name | Date |
|---|---|---|
| 1,747,604 | Schollkopf | Feb. 18, 1930 |
| 2,222,632 | Sachanen et al. | Nov. 26, 1940 |
| 2,290,603 | Stevens et al. | July 21, 1942 |
| 2,295,674 | Meharg et al. | Sept. 15, 1942 |
| 2,341,363 | Connolly | Feb. 8, 1944 |
| 2,382,506 | Schulze | Aug. 14, 1945 |
| 2,383,279 | Stillson et al. | Aug. 21, 1945 |
| 2,385,325 | Bailey, Jr. | Sept. 25, 1945 |
| 2,416,022 | Schulze et al. | Feb. 18, 1947 |
| 2,435,038 | Gilbert et al. | Jan. 27, 1948 |

OTHER REFERENCES

Thomas et al.: Jour. Am. Chem. Soc., vol. 66, 1694–6 (1944).

Hansford et al.: Ind. Eng. Chem., vol. 37, 671–5 (1945).